United States Patent
Julian et al.

(10) Patent No.: US 11,689,695 B1
(45) Date of Patent: Jun. 27, 2023

(54) COMPUTING TECHNOLOGIES FOR SCREENSHARING

(71) Applicant: Northern Trust Corporation, Chicago, IL (US)

(72) Inventors: Jeremy Julian, Long Grove, IL (US); Peter J. Smith, Highland Park, IL (US); Greg S. Degilio, Chicago, IL (US); Brittany J. Lerner, Frankfort, IL (US); Subbarao Mandavilli, Lake Zurich, IL (US); Sameer Manelkar, Naperville, IL (US); Alan Gault, Mount Prospect, IL (US)

(73) Assignee: Northern Trust Corporation, Chicago, IL (US)

( * ) Notice: Subject to any disclaimer, the term of this patent is extended or adjusted under 35 U.S.C. 154(b) by 0 days.

(21) Appl. No.: 18/082,036

(22) Filed: Dec. 15, 2022

(51) Int. Cl.
*G06F 3/0481* (2022.01)
*H04N 7/15* (2006.01)
*G06F 3/14* (2006.01)
*G06V 10/25* (2022.01)

(52) U.S. Cl.
CPC .......... *H04N 7/152* (2013.01); *G06F 3/1454* (2013.01); *G06V 10/25* (2022.01)

(58) Field of Classification Search
CPC .. G06F 3/0484; G06F 3/1454; G06F 21/6254; G06F 1/1605; G06F 1/163; G06F 3/0416; G06F 3/0481; G06F 3/0482; G06F 3/1423; G06V 10/25; G06V 40/113; H04L 12/1868; H04L 65/4015; H04L 65/403; H04L 9/3213; H04L 12/1403; H04L 65/1059; H04L 67/10; H04N 5/265; H04N 7/152; H04N 7/155; H04N 5/642; G06T 3/60; H04M 1/72412; H04W 4/80; H04W 12/50
See application file for complete search history.

(56) References Cited

U.S. PATENT DOCUMENTS

| | | |
|---|---|---|
| 5,812,125 A | 9/1998 | Wilkinson |
| 6,173,315 B1 | 1/2001 | DeLeeuw |
| 10,171,524 B2 * | 1/2019 | Privat ................ H04L 65/403 |
| 11,006,077 B1 | 5/2021 | Truong |
| 11,073,983 B2 * | 7/2021 | Zhu ...................... G06F 3/1454 |
| 11,330,021 B1 * | 5/2022 | Slotznick ............ H04L 65/1059 |
| 11,546,385 B1 * | 1/2023 | Slotznick ............. H04L 65/403 |

(Continued)

FOREIGN PATENT DOCUMENTS

| | | |
|---|---|---|
| EP | 2763387 A2 | 8/2014 |
| WO | WO2016073469 A1 | 5/2016 |

(Continued)

OTHER PUBLICATIONS

Zapier, How to share a presentation on Zoom without sharing your browser tabs and address bar, https://zapier.com/blog/share-part-of-screen-on-zoom/, downloaded from internet Jun. 4, 2022 (7 pages).

(Continued)

*Primary Examiner* — Gerald Gauthier
(74) *Attorney, Agent, or Firm* — Dentons US LLP

(57) ABSTRACT

This disclosure enables various technologies for screensharing to minimize visual distractions, maximize professionalism, or avoid sharing sensitive, confidential, classified, or private information.

26 Claims, 8 Drawing Sheets

(56) References Cited

U.S. PATENT DOCUMENTS

| | | | | |
|---|---|---|---|---|
| 11,621,979 B1* | 4/2023 | Slotznick | G06F 3/1454 348/14.07 |
| 2011/0134120 A1* | 6/2011 | Antonyuk | G06T 3/60 345/506 |
| 2011/0283203 A1* | 11/2011 | Periyannan | H04N 5/265 715/753 |
| 2015/0082058 A1* | 3/2015 | Hahm | G06F 3/1423 713/320 |
| 2015/0120817 A1* | 4/2015 | Jeong | H04L 67/10 709/203 |
| 2016/0170704 A1* | 6/2016 | Tamura | H04N 7/155 345/2.3 |
| 2016/0234276 A1 | 8/2016 | Ouyang | |
| 2016/0378422 A1* | 12/2016 | Kenjalkar | G06F 3/1423 726/6 |
| 2017/0131962 A1* | 5/2017 | Lee | G06F 3/1454 |
| 2017/0235435 A1* | 8/2017 | Sohn | G06F 3/0481 715/738 |
| 2017/0250830 A1* | 8/2017 | Chang | H04L 12/1403 |
| 2017/0257331 A1* | 9/2017 | Ohman | H04L 65/4015 |
| 2017/0363439 A1* | 12/2017 | Lee | G06F 3/1454 |
| 2019/0212901 A1* | 7/2019 | Garrison | G06F 3/1454 |
| 2020/0104004 A1* | 4/2020 | Yaginuma | G06F 3/0416 |
| 2021/0111950 A1* | 4/2021 | Moyers | G06F 3/0484 |
| 2021/0209640 A1* | 7/2021 | Jeong | G06F 3/1454 |
| 2021/0288829 A1* | 9/2021 | Zhang | H04L 9/3213 |
| 2021/0297467 A1* | 9/2021 | Guo | G06V 40/113 |
| 2022/0121352 A1 | 4/2022 | Vora | |
| 2022/0129230 A1* | 4/2022 | Ma | H04M 1/72412 |
| 2022/0214853 A1* | 7/2022 | Zilka | G06F 1/1605 |
| 2022/0272134 A1* | 8/2022 | Jain | H04L 12/1868 |
| 2022/0300730 A1* | 9/2022 | Eirinberg | G06F 1/163 |
| 2022/0300732 A1* | 9/2022 | Eirinberg | G06F 3/0482 |
| 2022/0308822 A1* | 9/2022 | Xu | H04W 12/50 |
| 2022/0308823 A1* | 9/2022 | Fan | G06F 3/0481 |
| 2022/0318033 A1* | 10/2022 | Pfoertsch | G06F 3/1454 |
| 2022/0324327 A1* | 10/2022 | Huang | H04W 4/80 |
| 2022/0358234 A1* | 11/2022 | Shank | G06F 21/6254 |
| 2022/0391158 A1* | 12/2022 | Lemmens | G06F 3/1454 |
| 2022/0391161 A1* | 12/2022 | Fan | G06F 3/1423 |
| 2023/0014520 A1* | 1/2023 | Le | G06V 10/25 |
| 2023/0020913 A1* | 1/2023 | Yoon | G06F 3/0481 |
| 2023/0051956 A1* | 2/2023 | Wallach | G06F 3/1454 |
| 2023/0064955 A1* | 3/2023 | Parker | H04N 5/642 |
| 2023/0091539 A1* | 3/2023 | Lan | G06F 3/1454 348/14.09 |

FOREIGN PATENT DOCUMENTS

| | | |
|---|---|---|
| WO | WO2019183726 A1 | 10/2019 |
| WO | WO2022078656 A1 | 4/2022 |

OTHER PUBLICATIONS

Zoom Support, Prerequisites for using the remote control feature in a zoom meeting, https://support.zoom.us/hc/en-us/articles/201362673-Requesting-or-giving-remote-control, downloaded from internet Jun. 1, 2022 (2 pages).

* cited by examiner

Start a new meeting
- Service team member can start a meeting by clicking on "Start a Meeting" on Profile Details Page.
- The message box will appear like below.
- You can put "Meeting Name". And then you can "START CLIENT MEETING"

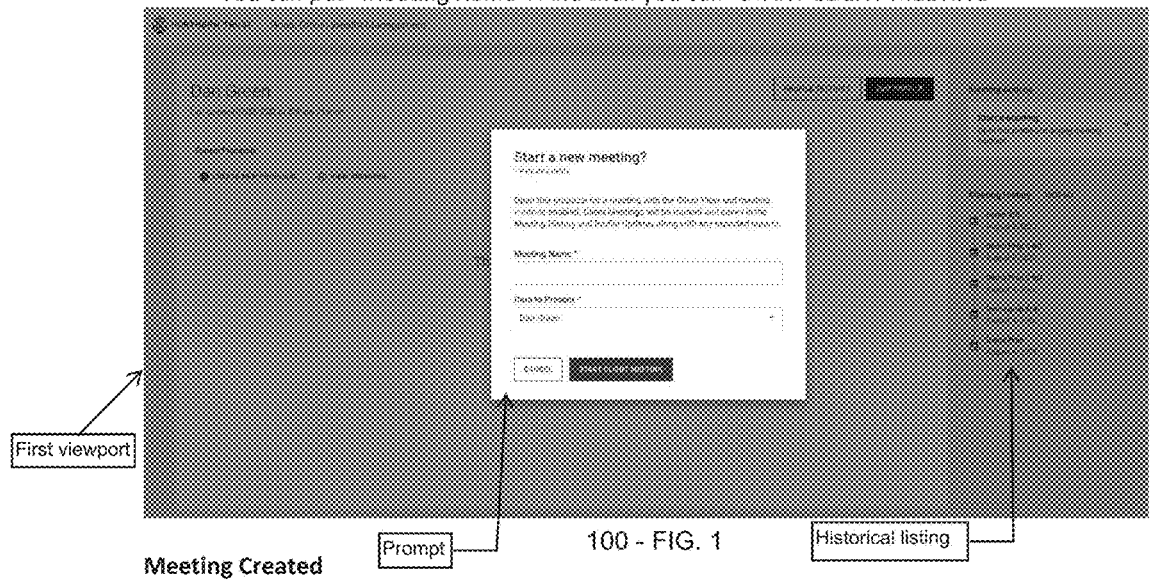

100 - FIG. 1

Meeting Created
- For a new meeting, presenter controls are shown with meeting options: "OPEN CLIENT VIEW", "START MEETING" and "END MEETING".
- Meeting status is shown as "Meeting not started".
- Red borderline will be shown around presentation pane.

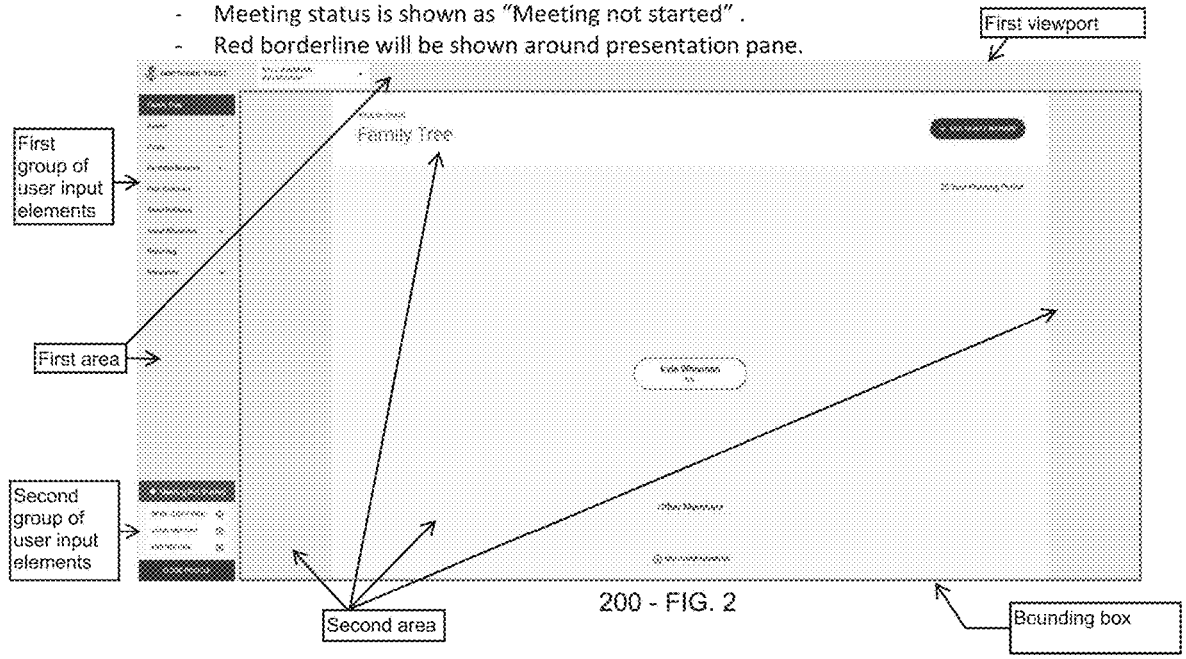

200 - FIG. 2

Meeting Started
- Meeting Status is changed as "Meeting in Progress"
- Meeting Options are changed with "PAUSE SHARING" and "STOP MEETING".

Synchronizing presenter view with client view
- When presenter navigates to "Asset Summary", client can see the same page where presenter currently opens.

Participant takes "Meeting Control"
- Presenter would be a participant and participant would be a presenter.
- Client view starts synchronizing with a new presenter view.
FIG. 7 - 700
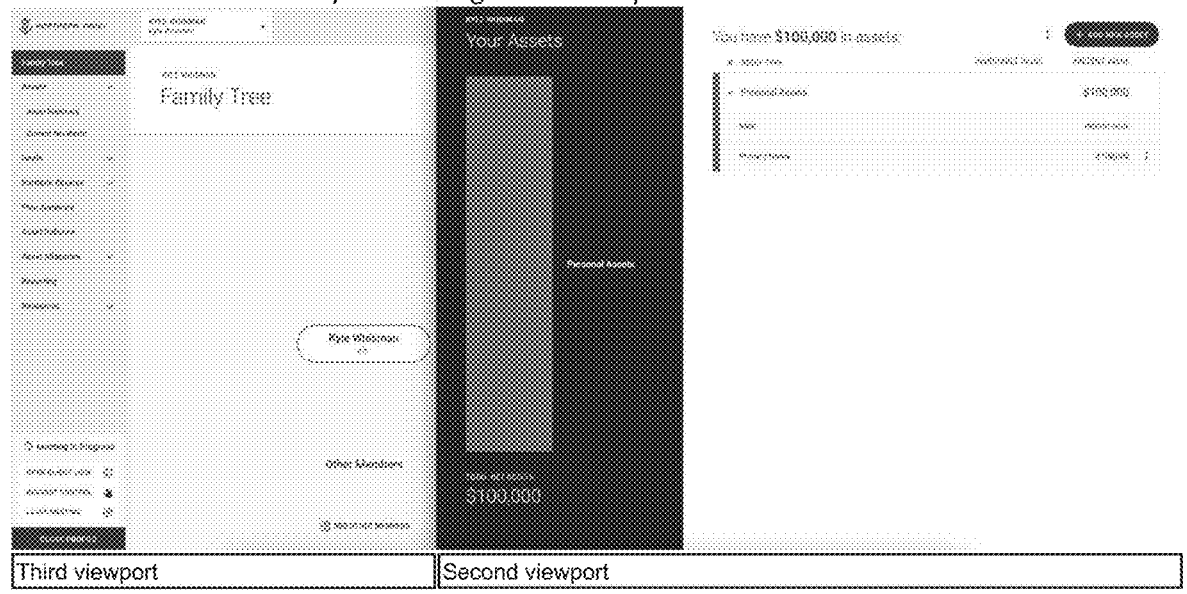
Request Control
- When a participant requests control, you can see the message on the corner of page: "You are now the Presenter"
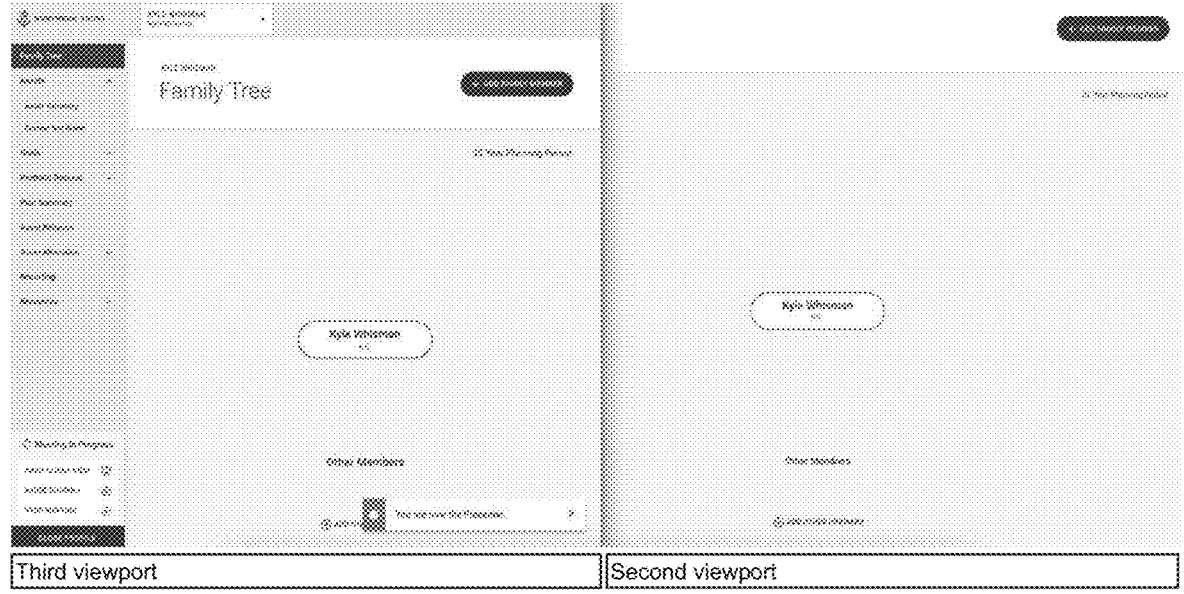
FIG. 8 - 800

Stop Meeting
- "Thank you" message will be displayed on client view.
- Presenter will have options": "RESUME SHARING" and "END MEETING".

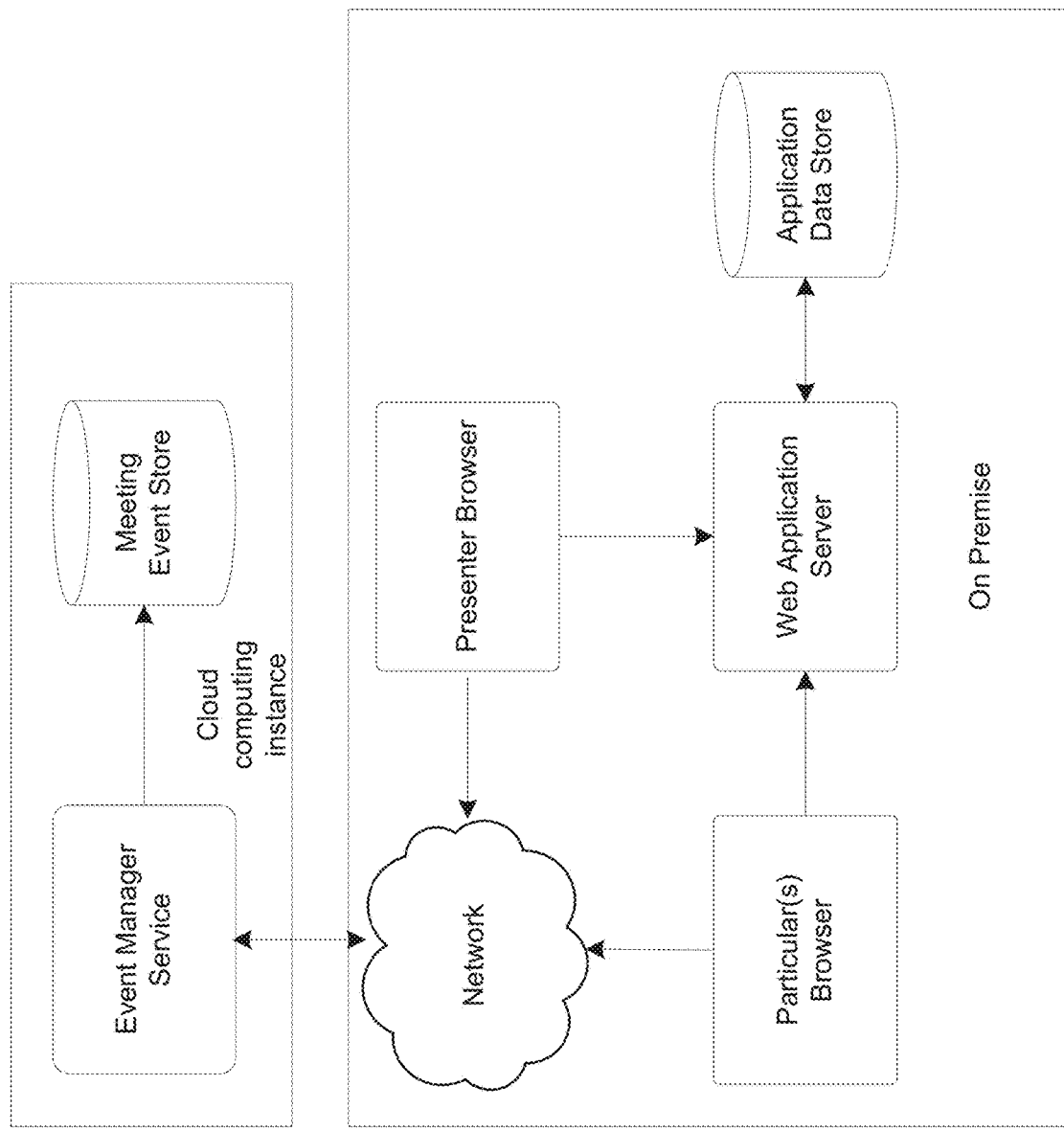
FIG. 10 - 1000

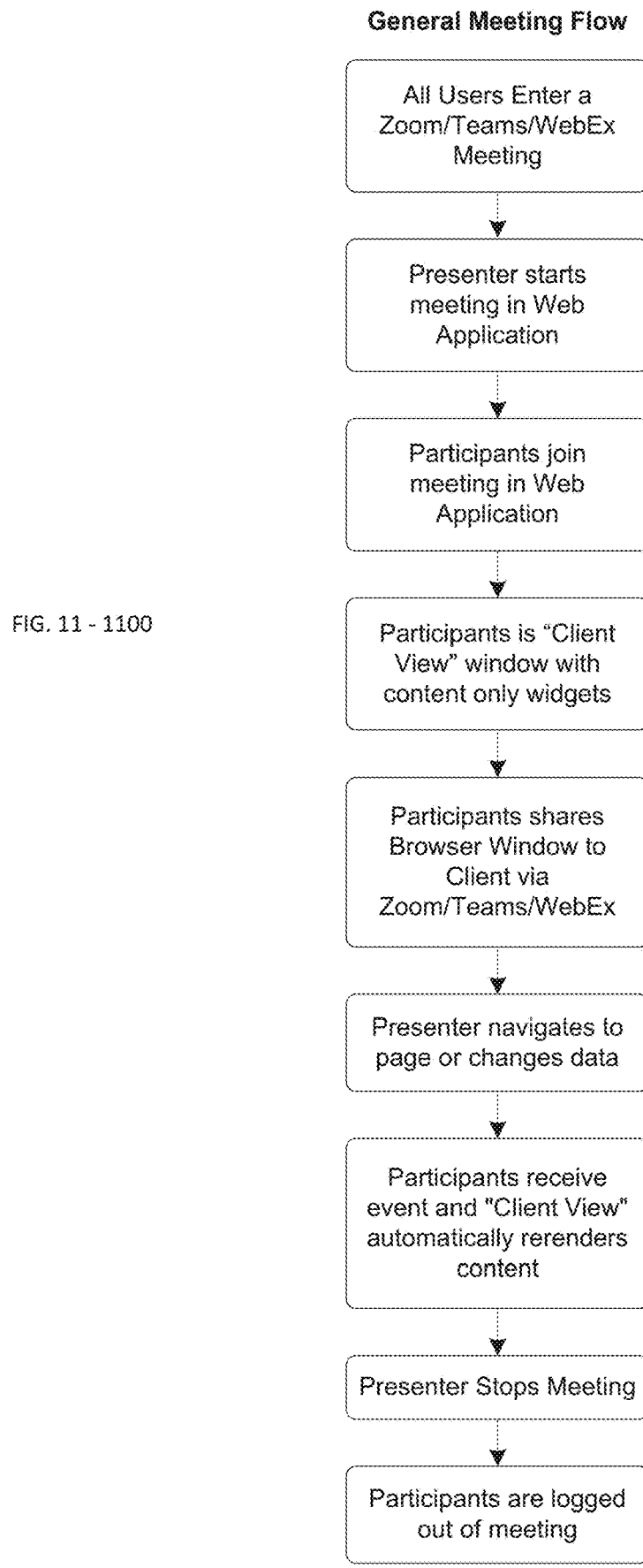
FIG. 11 - 1100

- Client View – A window or a pane is provided to Participants that displays only content relevant and not thwarting or distracting or sensitive for a meeting. This view disables or hides or does not present other normal widgets like menus, navigation bars, controls, footers, header, etc.
- Participants are provided a window or a pane that only displays information and data relevant for a client to see. One Participant will share "client View" over Zoom, Teams, WebEx, etc.
- Presenter uses a web application normally with an added control widget for meeting controls (e.g., stop, pause, start, end). Presenter navigates and change data that results in events being published to an Event Manager for subscription by Participants, as permissioned by user profiles.

Client view only shows content of data and widgets of value disabling or hiding or not presenting other aspects like menus, controls, summaries, etc.

What window or pane is used to present in a client view is known in advance because that has been mapped or hardcoded, i.e., a content portion of a window or a pane is in wrapped controls that can be used to render a client view.

Request Control Flow

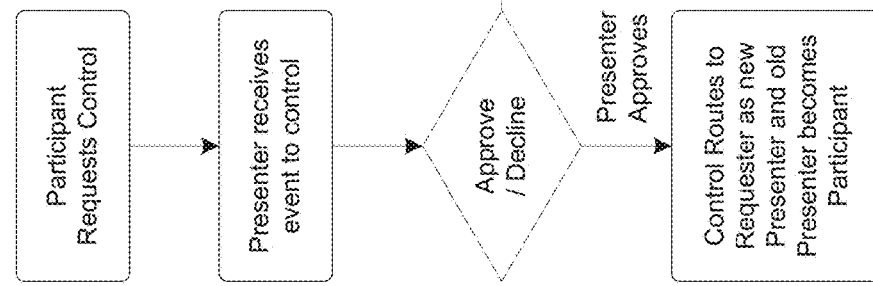

FIG. 12 - 1200

COMPUTING TECHNOLOGIES FOR SCREENSHARING

TECHNICAL FIELD

This disclosure relates to screensharing.

BACKGROUND

A person may be operating a computing terminal (e.g., a desktop computer, a laptop computer) running an operating system (OS) and an application program (e.g., a web browser application program) on the OS. The application program may have a navigation section (e.g., a set of navigation buttons, an address bar, an options menu, a tab section, a bookmark bar) and a viewport operative based on the navigation section, where the viewport is below or lateral to the navigation section. The person may desire to initiate or participate in a web conferencing session (e.g., a video-conferencing session) with other computing terminals operated by other people, whether via the application program or a dedicated web conferencing application program running on the OS. During the web conferencing session, in order to minimize visual distractions, maximize professionalism, or avoid sharing sensitive, confidential, classified, or private information presented within the viewport, the person may desire to screenshare only a specific area within the viewport, and not what is outside the specific area within the viewport, and not the navigation section, such that (1) this modality of screensharing can persist throughout the web conferencing session and (2) the person can control what is presented in the specific area by operating the viewport from (3) within the viewport, but outside the specific area, (4) within the specific area, or (5) the navigation section. However, this technology is not known to exist.

SUMMARY

This disclosure enables the person to screenshare only the specific area within the viewport, and not what is outside the specific area within the viewport, and not the navigation section, such that (1) this modality of screensharing can persist throughout the web conferencing session and (2) the person can control what is presented in the specific area by operating the viewport from (3) within the viewport, but outside the specific area, (4) within the specific area, or (5) the navigation section. As such, the person may minimize visual distractions, maximize professionalism, or avoid sharing sensitive, confidential, classified, or private information presented within the viewport. The person screensharing what is presented in the specific area within the viewport during the web conferencing session may be operating a user profile permissioned to read or otherwise access whatever is screenshared in the viewport, whether inside the specific area or outside the specific area. In contrast, other participants in the web conferencing session may have user profiles with less computing privileges at least with respect to the web conferencing session and therefore may not have computing privileges to read or otherwise access what is presented outside the specific area within the viewport from which screensharing is originating, but may have computing privileges to read or otherwise access what is presented inside the specific area within the viewport from which screensharing is originating. If the person is requested or desires to share or handoff control of screensharing to another computing terminal operated by another person also designated as a presenter with respect to a common participant in the web conferencing session, then the person can do so and the web conferencing session can continue from another computing terminal as is, in order to continue screensharing what is inside the specific area from another computing terminal and not what is outside the specific area from another computing terminal, without the common participant being aware or perceiving of such sharing or handoff.

In an embodiment, a system may comprise: a computing instance programmed to: present a first screen in a first viewport of a first application program operated by a first user profile from a first computing terminal to receive an attribute for a web conferencing session with a second application program including a second viewport operated by a second user profile from a second computing terminal, wherein the first user profile is more privileged than the second user profile with respect to the web conferencing session; present a second screen in the first viewport responsive to receiving the attribute, wherein the second screen includes a first area, a second area, and a bounding box such that the first area is positioned outside the bounding box, the second area is positioned inside the bounding box, and the first area and the second area completely define the second screen, wherein the first area contains a first user input element and a second user input element, wherein the first user input element is programmed to receive a selection of a content to be presented in the second area, wherein the second user input element is programmed to receive a command controlling the web conferencing session; and present a third screen in the first viewport based on receiving the command such that (1) the web conferencing session is started based on the attribute and the command, (2) the third screen presents the first area and the second area completely defining the third screen during the web conferencing session, (3) the second area presents the content based on the selection during the web conferencing session, and (4) the first application program screenshares the second area with the second application program during the web conferencing session such that the second viewport presents a fourth screen mirroring the second area in the first viewport containing the content being controlled based on the selection during the web conferencing session and not presenting the first area in the fourth screen during the web conferencing session.

DESCRIPTION OF DRAWINGS

FIG. 1 to FIG. 9 shows a set of embodiments of a set of screens according to this disclosure.

FIG. 10 is a hardware of an embodiment of a computing instance according to this disclosure.

FIG. 11 is a flowchart of an embodiment of a process for a web conferencing session with a screenshare according to this disclosure.

FIG. 12 is a flowchart of an embodiment of a process for sharing or handing off control to screenshare during a web conferencing session according to this disclosure.

DETAILED DESCRIPTION

Figures 3, 300:
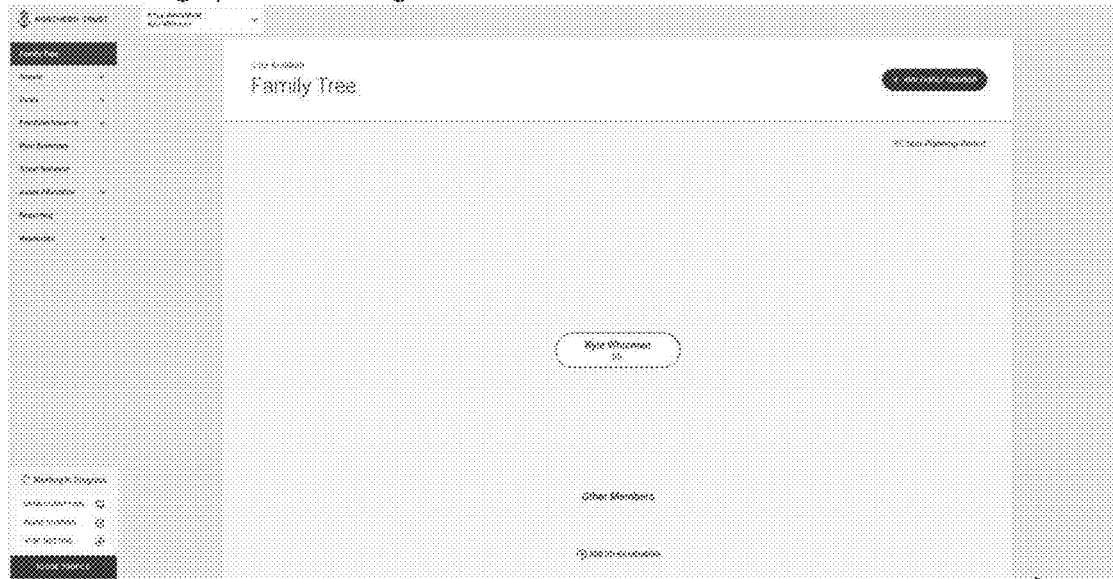
Figures 4, 400:
Figures 5, 500:
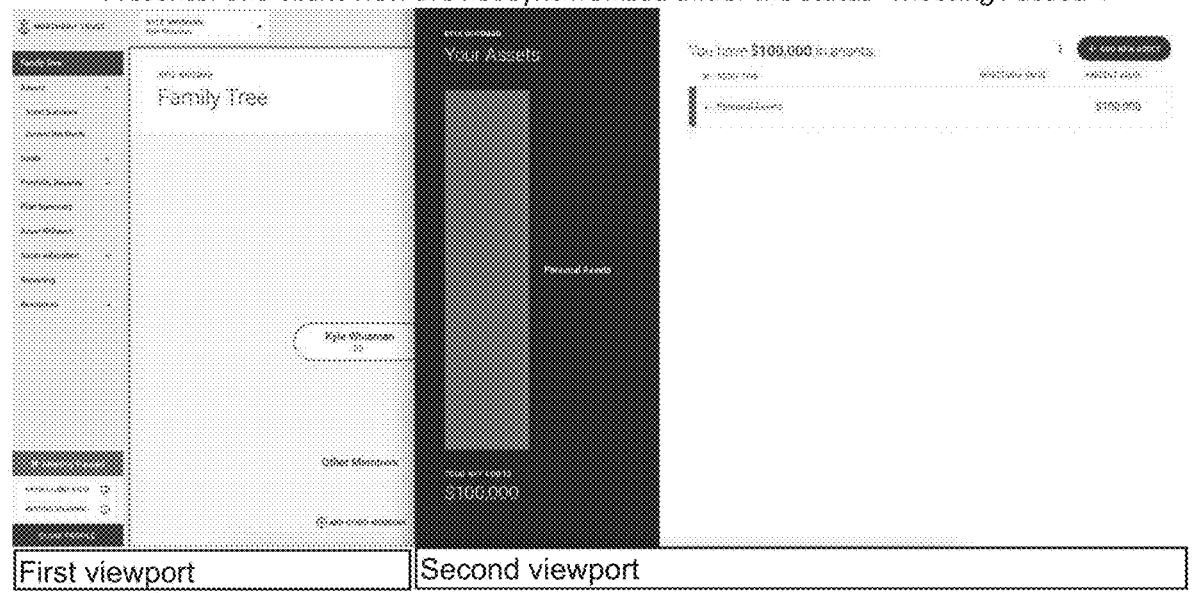
Figures 6, 600:
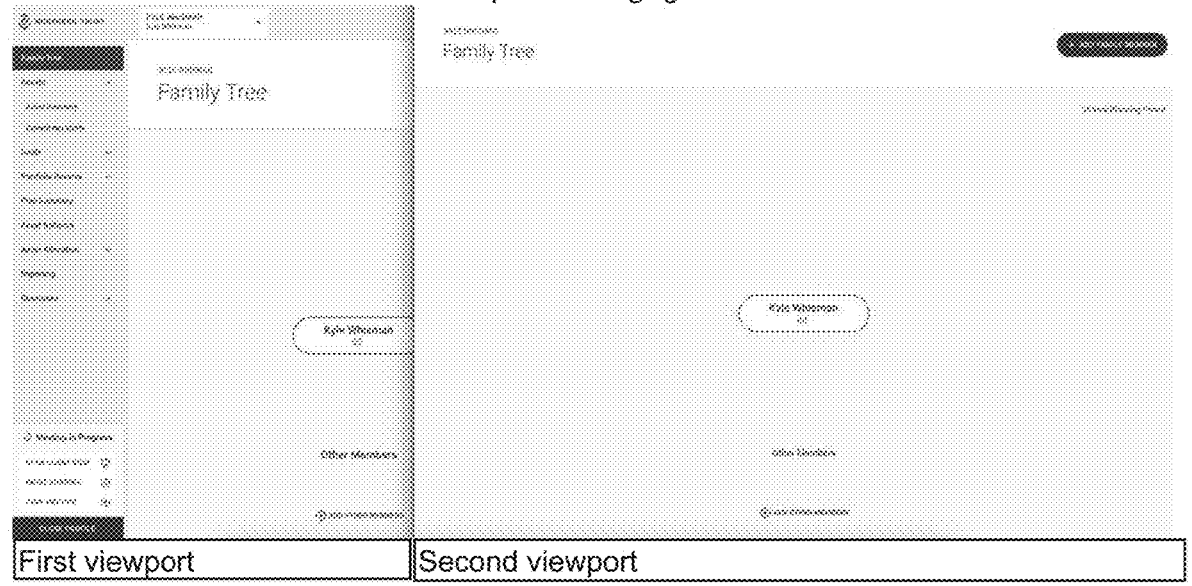
Figures 9, 900:
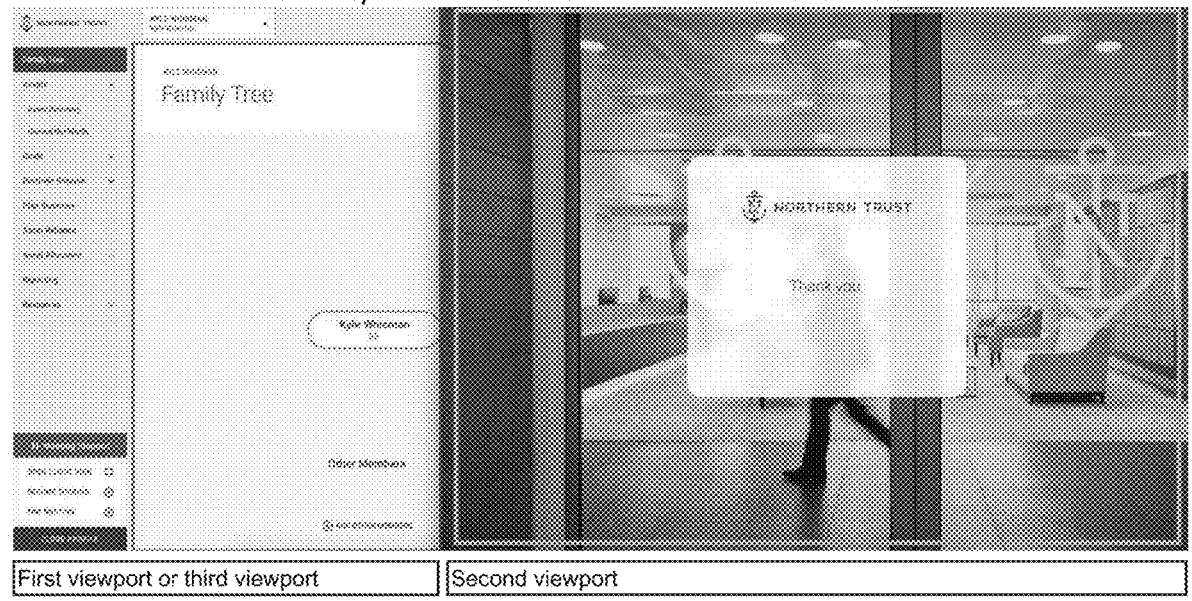

As explained above, this disclosure enables the person to screenshare only the specific area within the viewport, and not what is outside the specific area within the viewport, and not the navigation section, such that (1) this modality of screensharing can persist throughout the web conferencing session and (2) the person can control what is presented in the specific area by operating the viewport from (3) within the viewport, but outside the specific area, (4) within the specific area, or (5) the navigation section. As such, the person may minimize visual distractions, maximize professionalism, or avoid sharing sensitive, confidential, classified, or private information presented within the viewport. The person screensharing what is presented in the specific area within the viewport during the web conferencing session may be operating the user profile permissioned to read or otherwise access whatever is screenshared in the viewport, whether inside the specific area or outside the specific area. In contrast, other participants in the web conferencing session may have user profiles with less computing privileges at least with respect to the web conferencing session and therefore may not have computing privileges to read or otherwise access what is presented outside the specific area within the viewport from which screensharing is originating, but may have computing privileges to read or otherwise access what is presented inside the specific area within the viewport from which screensharing is originating. If the person is requested or desires to share or handoff control of screensharing to another computing terminal operated by another person also designated as the presenter with respect to the common participant in the web conferencing session, then the person can do so and the web conferencing session can continue from another computing terminal as is, in order to continue screensharing what is inside the specific area from another computing terminal and not what is outside the specific area from another computing terminal, without the common participant being aware or perceiving of such sharing or handoff.

This disclosure is now described more fully with reference to various figures that are referenced above, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms (e.g., two, three, four) as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, subsets, diagrams, or sections, these elements, components, regions, layers, subsets, diagrams, or sections should not necessarily be limited by such terms. Rather, these terms are used to distinguish one element, component, region, layer, subset, diagram, or section from another element, component, region, layer, subset, diagram, or section. As such, a first element, component, region, layer, subset, diagram, or section discussed below could be termed a second element, component, region, layer, subset, diagram, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

Features described with respect to certain embodiments may be combined in or with various other embodiments in any permutational or combinatory manner. Different aspects or elements of example embodiments, as disclosed herein, may be combined in a similar manner. The skilled artisan will understand that typically there is no limit on the number of items or terms in any combination, unless otherwise apparent from the context.

Hereby, all issued patents, published patent applications, and non-patent publications (including identified articles, web pages, websites, products and manuals thereof) that are mentioned in this disclosure are herein incorporated by reference in their entirety for all purposes, to same extent as if each individual issued patent, published patent application, or non-patent publication were specifically and individually indicated to be incorporated by reference. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

FIG. 1 to FIG. 9 shows a set of embodiments of a set of screens according to this disclosure. In particular, there may be a network over which a computing instance (e.g., a computing infrastructure/equipment enabling a server-client architecture) enables a web conferencing session (e.g., a video conferencing session) between a first computing terminal (e.g., a desktop computer, a laptop computer) and a second computing terminal (e.g., a desktop computer, a laptop computer). Each of the computing instance, the first computing terminal, and the second computing terminal is in communication (e.g., wired, wireless, waveguide) with the network. The network is a wide area network (WAN), a local area network (LAN), a cellular network, a satellite network, or any other suitable network, which can include Internet. Although the network can be a single network, this is not required and the network can be a group or collection of suitable networks collectively operating together in concert to accomplish various functionality, as disclosed herein.

The first computing terminal may be running a first OS and a first application program (e.g., a web browser application program) on the first OS operated by a first user profile through a first person. The first application program may have a first navigation section (e.g., a set of navigation buttons, an address bar, an options menu, a tab section, a bookmark bar) and a first viewport operative based on the first navigation section, where the first viewport is below or lateral to the first navigation section.

The second computing terminal may be running a second OS and a second application program (e.g., a web browser application program) on the second OS operated by a second user profile through a second person. The second application program may have a second navigation section (e.g., a set of navigation buttons, an address bar, an options menu, a tab section, a bookmark bar) and a second viewport operative based on the second navigation section, where the second viewport is below or lateral to the second navigation section.

The computing instance may be a cloud computing instance scalably and fault-tolerantly enabling the web conferencing session between the first computing terminal and the second computing terminal such that the first computing terminal can screenshare with the second computing terminal. For example, the web conferencing session can include an audio conferencing session or a video conferencing session between the first computing terminal and the second computing terminal, which may include screensharing, as disclosed herein. For example, the audio conferencing session or the video conferencing session between the first computing terminal and the second computing terminal may be enabled via a Web Real-Time Communication (RTC) protocol respectively implemented in each of the first application program and the second application program. Note that there may be more than two computing terminals participating in the web conferencing session among which screensharing may be possible, whether as presenters or participants, as disclosed herein. For example, there may be three or more computing terminals, whether presenters or participants, as disclosed herein. Each of these terminals may respectfully be running an OS and an application program (e.g., a web browser application program) on the OS operated by a user profile. The application program may respectfully have a navigation section (e.g., a set of navigation buttons, an address bar, an options menu, a tab section, a bookmark bar) and a viewport operative based on the navigation section, where the viewport is below or lateral to the navigation section. Note that the computing instance may enable multiple web conferencing sessions, as disclosed herein, whether occurring in parallel or serially.

To begin screensharing from the first computing terminal to the second computing terminal, the first user profile operates the first application program such that the first viewport presents a screen 100 (e.g., start a new meeting) presented in FIG. 1. Note that the first user profile is more privileged than the second user profile with respect to the web conferencing session. As such, the first user profile may be permissioned to read or otherwise access whatever is screenshared in the first viewport, as disclosed herein. In contrast, other participants in the web conferencing session may have user profiles with less computing privileges at least with respect to the web conferencing session and therefore may not have computing privileges to read or otherwise access everything that is presented in the first viewport, as disclosed herein, but may have computing privileges to read or otherwise access less than all that is presented inside the first viewport from which screensharing is originating, as disclosed herein. For example, the first user profile may be permissioned to read or otherwise access whatever is screenshared in the first viewport, as disclosed herein, but the second user profile may not have computing privileges to read or otherwise access everything that is presented in the first viewport, as disclosed herein, but may have computing privileges to read or otherwise access less than all that is presented inside the first viewport from which screensharing is originating, as disclosed herein.

The screen 100 is associated with a user profile (e.g., Dan Green) related to the web conferencing session. For example, the user profile may be the second user profile operating the second computing terminal. The screen 100 presents an identifier of a data file (e.g., a productivity suite file containing a proposal) related to the user profile and a link to view a list of archived data files related to the user profile. The screen 100 presents a user input element (e.g., a button) programmed to access a setting for the user profile when activated to change the setting based on which the web conferencing session, which may include screensharing, may take place and a user input element (e.g., a button) programmed to access a parameter for the user profile when activated to change the parameter based on which the web conferencing session, which may include screensharing, may take place. The screen 100 presents a historical listing of web conferencing sessions involving the user profile, which is updateable after each web conferencing session ends. The screen 100 presents a user input element (e.g., a button) to start the web conferencing session with the user profile above the historical listing of web conferencing sessions, although this positioning can vary. When the user input element to start the web conferencing session with the user profile is activated, a prompt is presented over the screen 100. The prompt is programmed to receive a user input for an attribute naming the web conferencing session based on which the web conferencing session, which may include screensharing, may take place. Note that there may be other attributes for the web conferencing session as well. The prompt is programmed to receive an identifier or a selection of a set of data to be presented during the web conferencing session, which may include screensharing. The set of data may be related to the user profile, which may be the second user profile. The prompt includes a user input element (e.g., a button) to start the web conferencing session when activated. For example, the prompt may present the identifier or the selection of the set of data between the attribute naming the web conferencing session and the user input element to start the web conferencing session, although this positioning can vary.

When the user input element to start the web conferencing session presented on the prompt is activated, then the first application program operates such that the first viewport responsively presents a screen 200 (e.g., meeting created) presented in FIG. 2. The screen 200 includes a first area, a second area, and a bounding box, to prepare the first user profile for screensharing via the first viewport with the second user profile view the second viewport, as disclosed herein. The first area is positioned outside the bounding box and includes a vertical sidebar and a horizontal portion. The second area is positioned inside the bounding box and includes a pane lateral to the vertical sidebar. The first area and the second area completely define the screen 200. The horizontal portion extends over the vertical sidebar and the pane. The horizontal portion includes a user input element programmed to receive a user input related to the user profile opened or presented in the screen 100 or the content presented in the second area.

The bounding box is a rectangle presented over the second area, but can have any suitable shape (e.g., a polygon, a square, a pentagon, a triangle, a circle, an oval). The bounding box is visually distinct relative to the first area and the second area. As shown, such visual distinction is by solid border line being colored red, but any color or line type is possible (e.g., dashed, dotted). The bounding box is less in perimeter or area than the first viewport, subject to how the first viewport and the first area is sized or shaped. The bounding box is positionally fixed but can be movable. The bounding box is fixed in size but can be adjusted. The bounding box is fixed in shape but can be adjusted.

The first area includes the vertical sidebar containing a first group of user input elements and a second group of user input elements. The first group of user input elements is positioned over the second group of user input elements, although this positioning can vary. The first group of user input elements includes a set of user input elements (e.g., a link, a button, a dropdown menu) each programmed to receive a selection of a content to be presented in the second area when activated. The second group of user input elements includes a set of user input elements (e.g., a link, a button, a dropdown menu) each programmed to receive a command controlling the web conferencing session when activated. The set of user input elements in second group of user input elements includes a user input element to open a client view, as disclosed herein, a user input element to start the web conferencing session, as disclosed herein, a user input element to end the web conferencing session, as disclosed herein, a user input to close the user profile opened or presented in the screen 100, or other suitable user input elements.

Positionally adjacent to the second group of user input elements is a visual indicator (e.g., a graphic, an icon, a text box) that dynamically and visually indicates whether the web conferencing session has not started, paused, or in progress, as updated based on the second group of set of user input elements. Note that such positioning of the visual indicator can vary. For example, the visual indicator may be positioned between the first group of user input elements and the second group of user input elements.

The second area is enclosed by the bounding box indicating that whatever is presented in the second area will be screenshared, as disclosed herein. In contrast, the first area is not enclosed by the bounding box indicating whatever is not presented in the first area will not be screenshared. As such, the person may minimize visual distractions, maximize professionalism, or avoid sharing sensitive, confidential, classified, or private information presented within the first viewport in the first area. Note that the second area enclosed by the bounding box contains a passive content (e.g., an alphanumeric text) and an active content (e.g., an alphanumeric text, a graphic, an icon, a button, a link, a profile identifier, a profile name), where the active content can be user interacted to update the non-interactive content or the interactive content. For example, by clicking a button named "ADD FAMILY MEMBER", the non-interactive content may be updated to present relevant information, in this case, by modifying the user profile related to the web conferencing session, which may be the second user profile. Therefore, the content presented in the second area in the first viewport screenshared with the second viewport during the web conferencing session may include a user input element (e.g., a link, a button) controlling or updating the content presented in the second area. Likewise, certain user input elements from the first set of user input elements or the second set of user input elements, each in the first area outside the bounding box, may be activated to update the passive or the interactive content presented in the second area enclosed by the bounding box.

When the user input element to start the web conferencing session in the second group of user input elements is activated, then the first application program operates such that the first viewport responsively presents a screen 300 (e.g., meeting started) presented in FIG. 3 and the second application program operates such that the second viewport responsively presents a screen 400 (e.g., synchronizing presenter view with client view). The screen 300 shows the first viewport presenting the first area and the second area, but not the bounding box (e.g., disappears, hidden), although the bounding box can be presented. What is contained in the second area in the screen 300, as previously enclosed by the bounding box in the screen 200, is screenshared with the second application program to present in the second viewport as the screen 400. What is not contained in the second area in the screen 300, as previously not enclosed by the bounding box in the screen 200, is not screenshared with the second application program to not present in the second viewport as the screen 400. Therefore, what is contained in the first area in the screen 300, as previously not enclosed by the bounding box in the screen 200, is not screenshared with the second application program to not present in the second viewport as the screen 400. As shown in the screen 300, the second area, which was previously enclosed by the bounding box in the screen 200, is screenshared with the second viewport as shown in the screen 400. However, the first area is, which was previously not enclosed by the bounding box in the screen 200, is not screenshared with the second viewport as shown in the screen 400. Resultantly, by not screensharing whatever is outside the bounding box in the screen 200, i.e., the first area, the person may minimize visual distractions, maximize professionalism, or avoid sharing sensitive, confidential, classified, or private information presented within the first viewport within the first area as shown in the screen 300 and present in the second viewport whatever is presented in the second area in the first viewport as shown in the screen 300. This selective sharing of the first viewport may occur because the second area at the first viewport is mapped or hardcoded to be screenshared with the second viewport during the web conferencing session, whereas the first area at the first viewport is mapped or hardcoded not to be screenshared with the second viewport during the web conferencing session, or not mapped or not hardcoded be screenshared with the second viewport during the web conferencing session.

The screen 300 shows the visual indicator changing from indicating that the web conferencing session has not started to the web conferencing session being in progress. The screen 300 shows the second group of user input elements now presenting a user input element (e.g., a button, a link) to pause screensharing, which indicates that screensharing from the first viewport to the second viewport has started. Accordingly, when the user input element to start the web conferencing session in the second group of user input elements is activated, i.e., the command controlling the web conferencing session (e.g., start the web conferencing session), the third screen 300 is presented in the first viewport based on receiving the command controlling the web conferencing session (e.g., start the web conferencing session) such that (1) the web conferencing session is started based on the attribute (e.g., a name of the web conferencing session) and the command (e.g., start the web conferencing session), (2) the third screen 300 presents the first area and the second area completely defining the third screen 300 during the web conferencing session, (3) the second area presents the content based on the selection (e.g., from the first group of user input elements) during the web conferencing session, and (4) the first application program screenshares the second area with the second application program during the web conferencing session such that the second viewport presents the screen 400 mirroring the second area in the first viewport containing the content being controlled based on the selection (e.g., from the first group of user input elements) during the web conferencing session, as shown in the screen 300, and not presenting the first area in the screen 400 during the web conferencing session. For example, the second viewport wholly presents the second area screenshared by synchronization from the first viewport, while avoiding presenting the first area not enclosed by the bounding box, as shown in the screen 200.

If the first application program includes a navigation section (e.g., a set of navigation buttons, an address bar, an options menu, a tab section, a bookmark bar) external to the first viewport, then the navigation section may be programmed to receive a navigation instruction (e.g., back, forward, refresh), which may impact or control the content presented in the second area within the first viewport. For example, the screen 300 may be presented in the first viewport based on receiving the command controlling the web conferencing session (e.g., start the web conferencing session) such that (1) the web conferencing session is started based on the attribute (e.g., a name of the web conferencing session) and the command (e.g., start the web conferencing session), (2) the screen 300 presents the first area and the second area completely defining the third screen during the web conferencing session, (3) the second area presents the content based on the selection (e.g., from the first group of user input elements) during the web conferencing session or the navigation instruction (e.g., back or forward) during the web conferencing session, and (4) the first application program screenshares the second area with the second application program during the web conferencing session such that the second viewport presents the screen 400 mirroring the second area in the first viewport containing the content being controlled based on the selection (e.g., from the first group of user input elements) during the web conferencing session, as shown in screen 300, or the navigation instruction (e.g., back or forward) during the web conferencing session and not presenting the first area in the screen 400 during the web conferencing session.

Each of the screen 200, the screen 300, and the screen 400 includes the user input element to open the client view in the second group of user input elements. When the user input element to open the client view in the second group of user input elements is activated, the first application operates such that the first viewport presents a screen simulating what would be or is presented in the screen 400. As such, the first user profile may make an adjustment at the first application program to screensharing between the first viewport and the second viewport before or during the web conferencing session. As such, the user input element to open the client view in the second group of user input elements may receive a request to present a screen within the first viewport simulating the second viewport presenting the second area and not presenting the first area.

Each of the screen 300 and the screen 400 includes the user input element to pause sharing of the second area in the first viewport to the second viewport. Therefore, when the user input element to pause sharing of the second area in the first viewport to the second viewport is active, the first application program operates the first viewport to present a screen 500 (e.g., meeting status: paused sharing) which changes the visual indicator from indicating that the web conferencing session is in progress to the web conferencing session being paused and the bounding box enclosing the second area in the first viewport reappears. At that time, the second viewport "freezes" to show whatever was shown there last. Therefore, the second area presented in the second viewport presents the content screenshared from the first viewport immediately before the user input element to pause sharing of the second area is activated while the link to pause screensharing is active at the first viewport. The screen 500 shows the set of user input elements in the second group of user input elements to include a user input element (e.g., a link, a button) to resume sharing when activated. Therefore, when the user input element to resume sharing is activated, the first application program operates the first viewport to present a screen 600 (e.g., resume sharing), which is similar to the screen 400 where the first viewport presents the first area and the second area and the second viewport presents the second area and not the first area due to the first area being outside the bounding box in the screen 200 and the second area being inside the bounding box in the screen 200, while the bounding box is not presented (e.g., disappears, hidden) during the screen 600, although the bounding box can be presented. Resultantly, when the user input element to resume sharing is activated, the content, as being presented in the second viewport in the screen 500, is updated at the second viewport to mirror the content in the second area at the first viewport, as shown in the screen 600, when the link to pause screensharing is deactivated at the first viewport.

The screen 300 includes the user input element to stop the web conference in the second group of user input elements when activated. As such, the screensharing stops when the user input element to stop the web conference in the second group of user input elements is activated.

As shown in the screen 200, the screen 300, the screen 400, the screen 500, and the screen 600, the first person screensharing what is presented in the second area within the first viewport from the first application program running on the first computing terminal during the web conferencing session may be operating via the first user profile permissioned to read or otherwise access whatever is screenshared in the first viewport, whether inside the second area or outside the second area (the first area), as shown in the screen 200 and the screen 300. For example, this type of permissioning may be enabled by a setting or a parameter within the first user profile or other user profiles (e.g., presenters). In contrast, other participants in the web conferencing session may have user profiles with less computing privileges at least with respect to the web conferencing session and therefore may not have computing privileges to read or otherwise access what is presented outside the second area (the first area) within the first viewport from which screensharing is originating, but may have computing privileges to read or otherwise access what is presented inside the second area within the first viewport from which screensharing is originating. For example, this type of permissioning may be enabled by a setting or a parameter within the second user profile or other user profiles (e.g., participants).

During the web conferencing session, if the first person (the first user profile) is requested or desires to share or handoff control of screensharing from the first computing terminal to another viewport of another application program (e.g., a web browser) running on another OS on another computing terminal (a third computing terminal) operated by another person (a third user profile operated by a third person) also designated as a presenter (e.g., based on a setting or a parameter within a user profile) with respect to a common participant (the second person) in the web conferencing session, as disclosed herein, then the person (the first user profile) can do so. Resultantly, the web conferencing session, including screensharing, as disclosed herein, can seamlessly continue from another computing terminal (third computing terminal) as is, in order to continue screensharing what is inside the second area from another computing terminal (third computing terminal) and not what is outside the second area from another computing terminal (third computing terminal), without the common participant (the second person) being aware or perceiving of such sharing or handoff. In such situation, the first viewport and the third viewport present the first area and the second area before and after this sharing or hand off occurs, whereas the second viewport presents the second area before and after this sharing or hand off occurs, as disclosed herein, to enable seamless screensharing transition from the first viewport to the third viewport. This modality of sharing or hand off is presented in a screen 700 (e.g., participant takes "meeting control") and a screen 800 (e.g., request control). While screensharing is originating from the first viewport, as disclosed herein, as for example in the screen 300, the screen 700 shows that the third viewport presenting the second group of user input elements in the first area, one of which is a user input element (e.g., a link, a button) requesting control of screensharing the second area from the third viewport when activated. As shown in the screen 700, the user input element requesting control of screensharing the second area from the third viewport is presented outside the second area and inside the first area. The third viewport presents the first area and the second area before this sharing or hand off occurs. The screen 700 shows that the third viewport presenting the second group of user input elements in the first area, one of which is a user input element (e.g., a link, a button) to leave meeting for that user profile when activated.

Once the user input element requesting control of screensharing is activated, then screensharing control or hand off occurs from the first viewport to the third viewport, as shown in the screen 800, and there is a prompt presented indicating that the third viewport is now presenting, as shown in the screen 800. This prompt is presented over the second area at the first viewport, but can be presented in the first area at the first viewport. However, this prompt is not presented at the second viewport, as shown in the screen 800. There may be a prompt presented at the first viewport indicating that the first viewport is no longer originating screensharing, as disclosed herein. The third viewport can now present to the second viewport, as the first viewport could when screensharing, before such screensharing was transitioned to the third viewport. For example, the content presented in the second area of the third viewport can be controlled from the first group of user input elements presented in the first area in the third viewport. For example, if the third application program is a web browser application program including a navigation section external to the third viewport programmed to receive a navigation instruction (e.g., back, forward, refresh), then the content presented in the second area in the third viewport can be controlled responsive to the navigation instruction, as disclosed herein. When screensharing control or hand off occurs from the first viewport to the third viewport, the second group of user input elements previously presented at the first viewport, as shown in the screen 300, is presented at the third viewport, as shown in the screen 800. Correspondingly, when screensharing control or hand off occurs from the first viewport to the third viewport, the second group of user input elements previously presented at the third viewport, as shown in the screen 700, is presented at the first viewport, as shown in the screen 300. Therefore, this "swapping" of the second group of user input elements provides a clear indication as to who is currently presenting, when there are at least two possible presenters to a common participant. Note that the request to share or hand off screensharing from the first viewport to the third viewport can be denied and a prompt informative of such denial may be presented in the third viewport, which may be in the first area or the second area, and not presented in the second viewport.

When screensharing from the first viewport or the third viewport to the second viewport is desired to be ended by whoever is presenting, whether from the first viewport or the third viewport, the person activates the user input element in the second group of user input elements presented in the first area to stop the web conferencing session, as shown in the screen 300. At that time, the first application program or the third application program respectively operates such that the first viewport or the third viewport presents a screen 900 (e.g., stop meeting), which is similar to the screen 200, but correspondingly updated. The screen 900 has the bounding box enclosing the second area in the first viewport or the third viewport, and not enclosing the first area in the first viewport or the third viewport. The visual indicator changes to indicate that the web conferencing session has stopped. Note that the user input element to resume sharing in the second group of user input elements is activatable to resume screensharing from the first viewport or the third viewport to the second viewport, as disclosed herein. For example, this may be relevant when the person accidentally activates the user input element in the second group of user input elements presented in the first area to stop the web conferencing session. The second group of the user input elements includes a user input element (e.g., a link, a button) to end the web conferencing session, which would present the screen 100 in the first viewport or the third viewport. When screensharing from the first viewport or the third viewport to the second viewport ends, as respectively activated from the second group of user input elements presented in the first area in the first viewport or the third viewport, the second viewport presents a screen, as shown in the screen 900 that is visually different from each of the screen 100, the screen 200, the screen 300, and the screen of the second viewport presented in the screen 400, the screen 500, the screen 600, the screen 700, and the screen 800. As such, the screen shown in the second viewport at that time can include an image being presented full-screen in the second viewport and a prompt with a message presented over the image, as shown in the screen 900.

FIG. 10 is a hardware diagram of an embodiment of a computing instance according to this disclosure. In particular, the computing instance may be embodied according to a hardware diagram 1000 having a cloud computing instance and a computing infrastructure on-premises.

The cloud computing instance includes a server to manage a set of events (e.g., a data object, a record, a data structure, a data entry), each of which may include a web conferencing session(s) and a corresponding screenshare(s). For example, the service may include an Azure Relay service to securely expose services that run in a private network to a public cloud, which may be without opening a port on a firewall, or making intrusive changes to the private network's infrastructure, while supporting scenarios between on-premises services and applications running in a cloud or in another on-premises environment (e.g., one-way, request/response, and peer-to-peer communication, event distribution at internet-scope to enable publish/subscribe scenarios, bi-directional and unbuffered socket communication across network boundaries). The service may maintain a list of audience members (e.g., participants and presenters) and has interfaces for publishing and subscribing to events (e.g., web conferencing sessions). The cloud computing instance includes a database (e.g., a relational database, an in-memory database, a NoSQL database) for storing the set of events and a set of user profiles permissioned, as disclosed herein.

The computing infrastructure on-premises include the network, as disclosed herein. The computing infrastructure on-premises includes a presentation application program (e.g., a web browser having a viewport) with a set of user input elements (e.g., the first group of user input elements and the second group of user input elements) to control a web conferencing session. The computing infrastructure on-premises includes a participant application program (e.g., a web browser having a viewport) that presents a subset of content available to the presentation application program, based on user profiles permissioned, as disclosed herein. Other content available to the presentation application program, based on user profiles permissioned, as disclosed herein, may not be presented or disabled or hidden, to minimize visual distractions, maximize professionalism, or avoid sharing sensitive, confidential, classified, or private information presented within the viewport, as disclosed herein. The computing infrastructure on-premises includes a web application enabling the web conferencing sessions, including screensharing, as disclosed herein. The computing infrastructure on-premises includes a database (e.g., a relational database, an in-memory database, a NoSQL database) for storing a set of content that is available to the presentation application program from which a subset of presented to the participant application program, as disclosed herein.

FIG. 11 is a flowchart of an embodiment of a process for a web conferencing session with a screenshare according to this disclosure. In particular, a process 1100 enables a web conferencing session, including a screenshare, as disclosed herein. The process 1100 includes a presenter and a participant respectively operating an application program dedicated for web conferencing sessions, including screensharing, to start the web conferencing session between the presenter and the participant and the presenter starts to screenshare, as disclosed herein. The presenter has more content presented for screensharing in a respective viewport than the participant as a subset of such content is presented to the participant in a respective viewport, as disclosed herein. Therefore, the presenter can change or update the subset of content, without the participant being visibly aware of how such change or update was made by the presenter, as those control elements are not presented to the participant.

FIG. 12 is a flowchart of an embodiment of a process for sharing or handing off control to screenshare during a web conferencing session according to this disclosure. In particular, a process 1200 enables a transition of control for screensharing during a web conferencing session from a presenter to a participant, who is permissioned to be a presenter, with a common participant, who is not permissioned to be a presenter, as disclosed herein. On such transition, the presenter becomes the participant and the participant becomes the presenter, with the common participant remaining as is and still seeing whatever was presented before transition of control, as disclosed herein.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to be-come coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state- setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or pro-gram statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as dis-closed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required be-fore, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled artisans know that various modifications, additions, substitutions and the like can be made without departing from spirit of this disclosure. As such, these are considered to be within the scope of the disclosure, as defined in the following claims.

What is claimed is:

1. A system comprising:
a non-transitory computing instance programmed to:
present a first screen in a first viewport of a first application program operated by a first user profile from a first computing terminal to receive an attribute for a web conferencing session with a second application program including a second viewport operated by a second user profile from a second computing terminal, wherein the first user profile is more privileged than the second user profile with respect to the web conferencing session;
present a second screen in the first viewport responsive to receiving the attribute, wherein the second screen includes a first area, a second area, and a bounding box such that the first area is positioned outside the bounding box, the second area is positioned inside the bounding box, and the first area and the second area completely define the second screen, wherein the first area contains a first user input element and a second user input element, wherein the first user input element is programmed to receive a selection of a content to be presented in the second area, wherein the second user input element is programmed to receive a command controlling the web conferencing session; and present a third screen in the first viewport based on receiving the command such that (1) the web conferencing session is started based on the attribute and the command, (2) the third screen presents the first area and the second area completely defining the third screen during the web conferencing session, (3) the second area presents the content based on the selection during the web conferencing session, and (4) the first application program screenshares the second area with the second application program during the web conferencing session such that the second viewport presents a fourth screen mirroring the second area in the first viewport containing the content being controlled based on the selection during the web conferencing session and not presenting the first area in the fourth screen during the web conferencing session.

2. The system of claim 1, wherein the attribute names the web conferencing session.

3. The system of claim 1, wherein the attribute selects a set of data corresponding to the content.

4. The system of claim 1, wherein the first screen includes (1) a historical listing of web conferencing sessions involving the second user profile before the web conferencing session and (2) a first link to access a setting for the second user profile or a second link to access a parameter for the second user profile.

5. The system of claim 1, wherein the first screen includes a third link to initiate a prompt over the first screen, wherein the prompt is programmed to receive the attribute.

6. The system of claim 1, wherein the bounding box is a polygon presented over the second screen.

7. The system of claim 1, wherein the bounding box is visually distinct relative to the first area and the second area.

8. The system of claim 1, wherein the first user input element is included in a dropdown menu positioned in the first area.

9. The system of claim 1, wherein the first area includes a third user input element programmed to receive a request to present a fifth screen within the first viewport simulating the second viewport presenting the second area and not presenting the first area.

10. The system of claim 1, wherein the second user input element is a first link to start the web conferencing session or a second link to end the web conferencing session.

11. The system of claim 1, wherein the first area includes a visual indicator that indicates whether the web conferencing session has not started, paused, or in progress.

12. The system of claim 1, wherein the first area includes a vertical sidebar containing the first user input element and the second user input element, wherein the second area is a pane lateral to the vertical sidebar.

13. The system of claim 12, wherein the first area includes a horizontal portion extending over the vertical sidebar and the pane, wherein the horizontal portion includes a third user input element programmed to receive a user input related to the second user profile or the content presented in the second area.

14. The system of claim 1, wherein the first area includes a link to pause screensharing the second area with the second viewport.

15. The system of claim 14, wherein the second area presented in the second viewport presents the content screenshared from the first viewport immediately before the link to pause screensharing is activated while the link to pause screensharing is active at the first viewport.

16. The system of claim 15, wherein the content is updated at the second viewport to mirror the content in the second area at the first viewport when the link to pause screensharing is deactivated at the first viewport.

17. The system of claim 1, wherein the second area at the first viewport is mapped or hardcoded to be screenshared with the second viewport during the web conferencing session and the first area at the first viewport is mapped or hardcoded not to be screenshared with the second viewport during the web conferencing session or not mapped or not hardcoded be screenshared with the second viewport during the web conferencing session.

18. The system of claim 1, wherein each of the first application program and the second application program is a web browser application program.

19. The system of claim 1, wherein the first application program includes a navigation section programmed to receive a navigation instruction, wherein the navigation section is external to the first viewport, wherein the third screen is presented in the first viewport based on receiving the command such that (1) the web conferencing session is started based on the attribute and the command, (2) the third screen presents the first area and the second area completely defining the third screen during the web conferencing session, (3) the second area presents the content based on the selection during the web conferencing session or the navigation instruction during the web conferencing session, and (4) the first application program screenshares the second area with the second application program during the web conferencing session such that the second viewport presents the fourth screen mirroring the second area in the first viewport containing the content being controlled based on the selection during the web conferencing session or the navigation instruction during the web conferencing session and not presenting the first area in the fourth screen during the web conferencing session.

20. The system of claim 1, wherein the computing instance is programmed to pass control of screensharing of the second area from the first viewport to a third viewport of a third application program operated by a third user profile from a third computing terminal during the web conferencing session based on receiving a request from the third viewport during the web conferencing session, wherein the request is input into the third viewport outside the second area being screenshared in the third viewport from the first viewport such that the third application program screenshares the second area with the second application program during the web conferencing session and the second viewport continues to present the fourth screen mirroring the second area now from the third viewport containing the content being controlled based on the selection in the third viewport during the web conferencing session and not presenting the first area in the fourth screen during the web conferencing session while the first area is presented in the third viewport, wherein the third user profile is more privileged than the second user profile with respect to the web conferencing session.

21. The system of claim 20, wherein the third application program includes a navigation section programmed to receive a navigation instruction such that the content presented in the second area in the third viewport can be controlled based on the selection during the web conferencing session in the third viewport or the navigation instruction during the web conferencing session, wherein the navigation section is external to the third viewport.

22. The system of claim 20, wherein the third application program is a web browser application program.

23. The system of claim 20, wherein the computing instance is programmed to present a prompt over the second area presented in the third viewport indicating that control of screensharing of the second area has passed from the first viewport to the third viewport while the second viewport presents the fourth screen mirroring the second area in the third viewport containing the content being controlled based on the selection during the web conferencing session and not presenting the first area in the fourth screen during the web conferencing session.

24. The system of claim 1, wherein the computing instance is programmed to present a fifth screen in the second viewport when the web conferencing session is ended from the first area presented in the first viewport, wherein the fifth screen is visually different from each of the first screen, the second screen, the third screen, and the fourth screen.

25. The system of claim 1, wherein the computing instance is programmed to present the second screen in the first viewport when the web conferencing session is ended from the first viewport.

26. The system of claim 1, wherein the content presented in the second area in the first viewport screenshared with the second viewport during the web conferencing session includes a third user input element controlling or updating the content.

* * * * *